Figure 1:
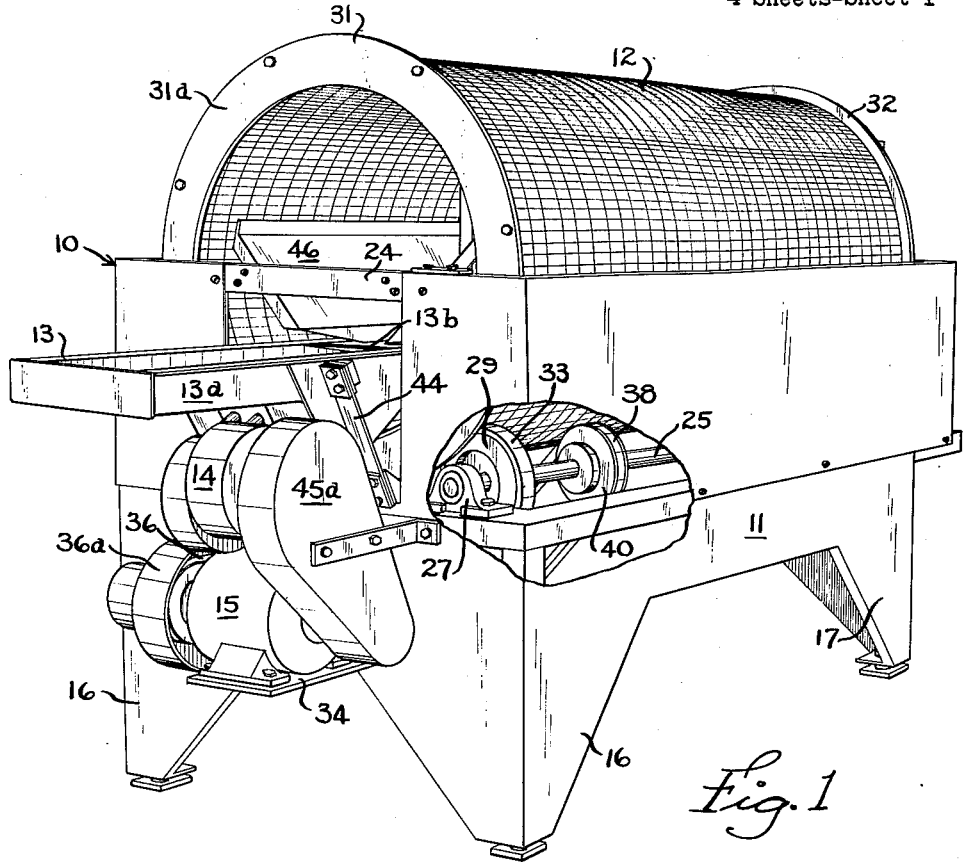

July 5, 1966

W. N. HUGHES 3,259,241

UNSNIPPED BEAN REMOVER

Filed Jan. 21, 1965

4 Sheets-Sheet 1

INVENTOR.
WILLIAM N. HUGHES
BY Joseph G. Werner

ATTORNEY

July 5, 1966  W. N. HUGHES  3,259,241
UNSNIPPED BEAN REMOVER

Filed Jan. 21, 1965  4 Sheets-Sheet 2

INVENTOR.
WILLIAM N. HUGHES
BY Joseph G. Werner

ATTORNEY

July 5, 1966  W. N. HUGHES  3,259,241
UNSNIPPED BEAN REMOVER

Filed Jan. 21, 1965  4 Sheets-Sheet 3

INVENTOR.
WILLIAM N. HUGHES
BY Joseph G. Werner

ATTORNEY

INVENTOR.
WILLIAM N. HUGHES

United States Patent Office 3,259,241
Patented July 5, 1966

3,259,241
UNSNIPPED BEAN REMOVER
William N. Hughes, Columbus, Wis., assignor to Hughes Company, Inc., Columbus, Wis., a corporation of Wisconsin
Filed Jan. 21, 1965, Ser. No. 426,764
7 Claims. (Cl. 209—78)

This invention relates to apparatus for separating string beans having stem portions attached thereto from string beans which have had their stems removed, and more particularly to apparatus for removing "unsnipped" string beans from a mixed supply of "snipped" and "unsnipped" string beans coming from a conventional bean-snipper machine.

One of the steps in the process for canning string beans is to remove from the beans that portion of the stem which is ordinarly picked from the bean plant with each bean. To remove these attached stems, the beans are ordinarily passed through a conventional bean-snipper machine which snips or cuts off the stems. Due to the non-uniform size of string beans, the bean-snipper machines are only 90 to 99 percent efficient and ordinarily 1 to 10 percent of the beans come through the snipper machines with their stems still intact. These beans are referred to as "unsnipped" beans. After the beans have gone through the bean-snipper machine, it is necessary to remove that 1 to 10 percent of the beans which did not have their stems removed from those beans that did, so that the unsnipped beans do not go on to be canned with the snipped beans.

Accordingly, an object of my invention is to provide a new and improved machine for removing the unsnipped beans from the snipped beans as they come from a conventional bean-snipper machine.

Another object of my invention is to provide a relatively inexpensive machine for removing unsnipped beans from a mixed supply of snipped and unsnipped beans which is both simple in construction and dependable in operation.

Another object of my invention is to provide a machine for removing unsnipped beans without skinning or otherwise damaging them.

Still another object of my invention is to provide a new and improved unsnipped bean removing machine which is clean in operation and which, if desired, can be easily cleaned after use.

Further objects, features and advantages of my invention will become apparent from the following detailed description taken in conjunction with the accompanying drawings showing a preferred, exemplary embodiment of my invention.

Figure 2:
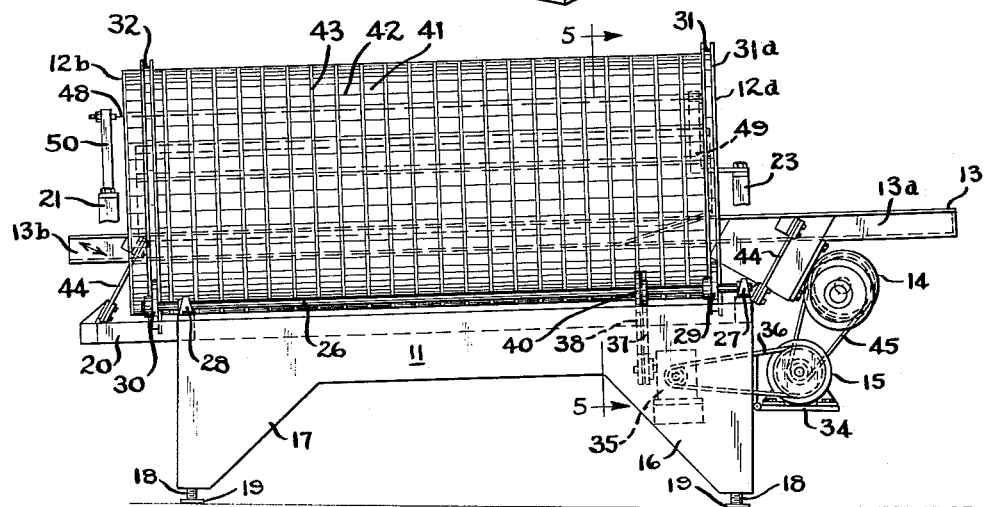
Figure 3:
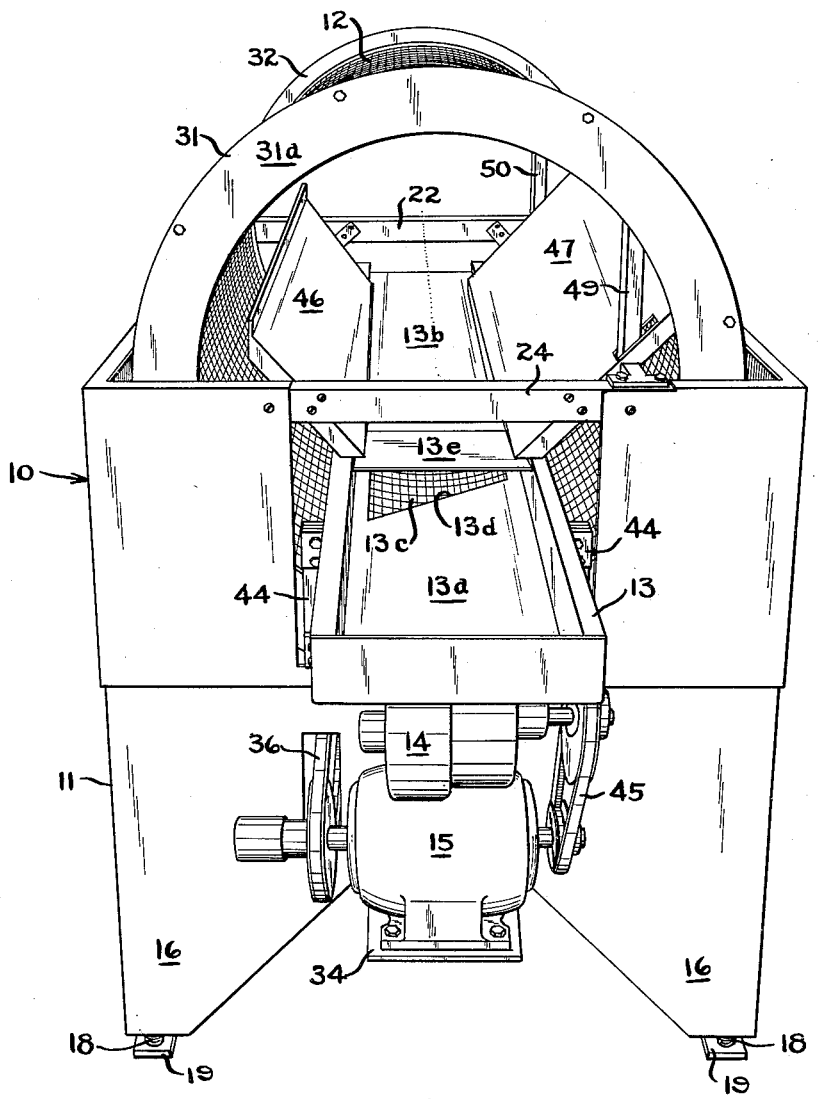
Figure 4:
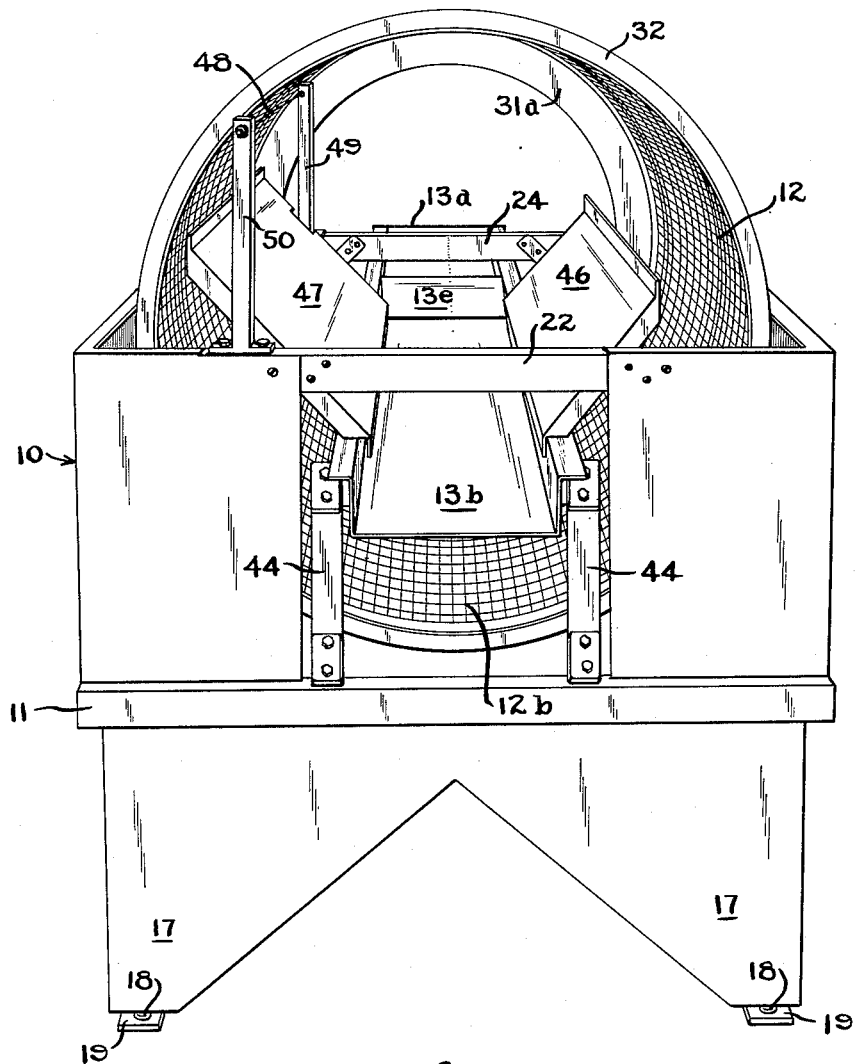
Figure 5:
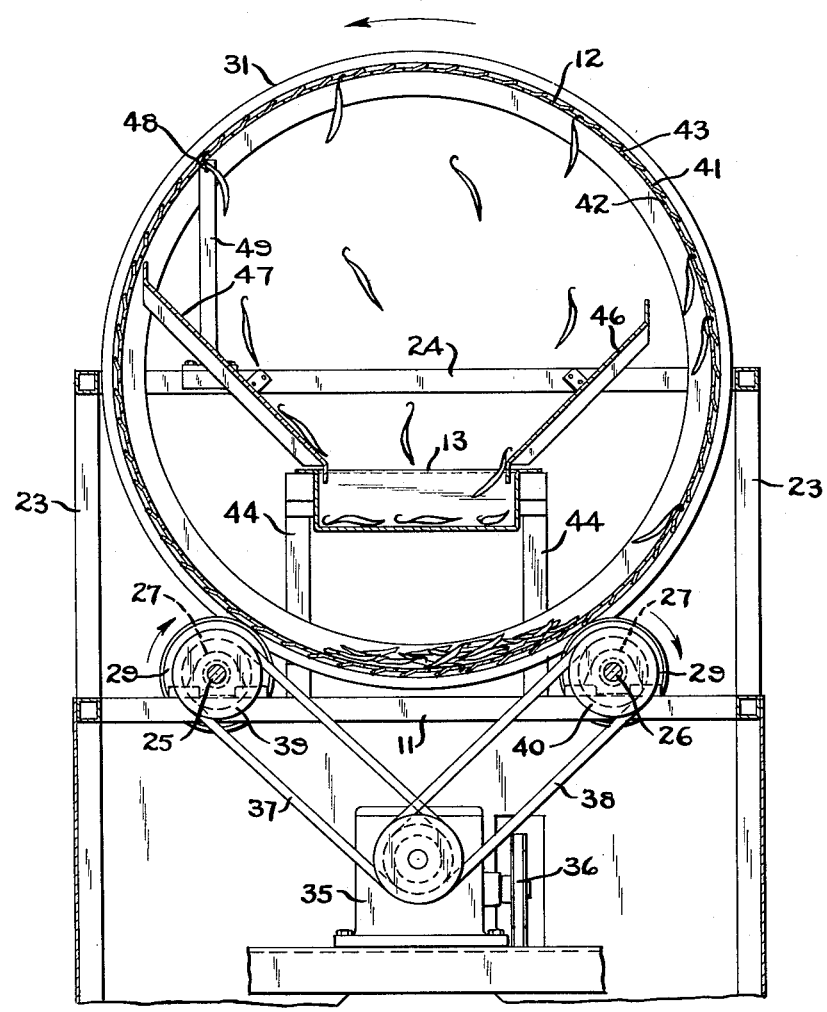

In the drawings:

FIG. 1 is a perspective view of my unsnipped bean remover with a portion thereof broken away, FIG. 2 is a side elevation of my unsnipped bean remover with portions thereof broken away and the side panels removed, FIG. 3 is a perspective view of the infeed end of my unsnipped bean remover, FIG. 4 is a perspective view of the discharge end of my unsnipped bean remover, and FIG. 5 is a fragmentary cross-sectional view taken along line 5—5 of FIG. 2 showing my unsnipped bean remover with beans therein.

Referring now more specifically to the drawings, my unsnipped bean removing machine is shown generally at 10 in FIG. 1. My machine 10 generally comprises a four-legged frame 11, a louvered, cylindrical drum 12 supported on frame 11 for rotation about its longitudinal axis for separating unsnipped beans from snipped beans, a conveyor table 13 having an infeed portion 13a for depositing a mixed supply of snipped and unsnipped beans in the drum 12 and having a discharge portion 13b for discharging unsnipped beans from the drum 12, a shaker 14 for vibrating the conveyor table 13, and a motor 15 for rotating the drum 12 and driving the shaker 14.

More particularly, the frame 11 of my machine 10 comprises a pair of forward and rear legs 16 and 17, respectively. As best seen in FIG. 2, the forward legs 16 may be slightly longer than the rear legs 17, thereby elevating the infeed end 12a of the drum 12 with respect to its discharge end 12b. While the declination of the drum 12 may vary somewhat, I have found that a declination of about 2° from the horizontal is suitable for most bean runs. Each of the forward legs 16 is provided with a threaded stud 18 and a base plate 19 for adjusting the elevation of the infeed end 12a of the drum 12. The rear legs 17 may have similar studs and base plates, if desired.

The frame 11 has a rearwardly extending member 20 which supports a pair of rear, upright members 21 connected at their upper ends by a rear cross-member 22 which is shown in FIGS. 3 and 4. FIG. 5 shows a pair of forward upright members 23 which are connected at their upper ends by a forward cross-member 24.

Referring now to FIGS. 1, 2 and 5, a pair of drive shafts 25 and 26 are provided for rotating drum 12. The drive shafts 25 and 26 are rotatably supported in bearings 27 and 28 which are mounted at the ends of frame 11. Each of the drive shafts 25 and 26 have a first drive wheel 29 fixedly attached at its forward end and a second drive wheel 30 fixedly attached at its rear end. The drum 12 has a forward channeled rim 31 and a rear channeled rim 32 fixedly attached about its periphery. Forward rim 31 has a flange 31a which extends inwardly of the wall of the drum 12 for preventing the spillage of beans out the infeed end 12a of the drum 12. The rear drive wheels 30 are adapted to run in rear channeled rim 32 and the forward drive wheels 29 are adapted to run in forward channeled rim 31. The drive wheels 29 and 30 may be cushioned by a band 33 of resilient rubber-like material as shown in FIG. 1 to provide quieter operation and longer drive wheel and rim life.

FIGS. 1, 2, 3 show a drive motor 15 for revolving the drum 12 about its longitudinal axis. The motor 15 is supported on plate 34 which is fixedly attached to the forward end of the frame 11. A reducer 35, shown in FIGS. 2 and 5, is mounted on frame 11 under the infeed end of the drum 12. The motor 15 drives the reducer 35 through a V-belt 36 and reducer 35 in turn drives the drive shafts 25 and 26 through a pair of chains or V-belts 37 and 38 which are trained over pulleys 39 and 40 fixed to drive shafts 25 and 26, respectively. The drive shafts and the drum are rotated in the directions indicated by the arrows in FIG. 5. As shown in FIG. 1, V-belt 36 may be covered by a protective guard 36a.

Referring again to FIGS. 2 and 5, the wall of the drum 12 has a plurality of rows of louvers 41 spaced substantially along the length of the drum between channeled rims 31 and 32. The longitudinal edges 42 of the louvers 41 are adapted to be engaged by the short hooked stems of the unsnipped beans so that the drum will carry the unsnipped beans upwardly as it revolves. Since the beans tend to slide rearwardly on the longitudinal edges 42, the louvers are bent outwardly of the drum 12, rather than inwardly, so as to provide rear edges 43 at the rear ends of longitudinal edges on which the beans are hooked for abutting the stems of the unsnipped beans. This is an important advance over the known drum constructions wherein the louvers on the upwardly moving side of the drum project upwardly and inwardly. In the known drums, the stems of the unsnipped beans hook onto the inwardly bent portion of the louvers and the unsnipped beans often work themselves rearwardly and fall off the rear end of this inwardly bent portion since there is no rear edge to stop their rearward movement.

While the length of the louvers 41 may be varied substantially, they should preferably be in the range of about one to three inches in length. The longer the louvers 41 are, the greater the chance that the beans will become disengaged from longitudinal edges 42 as they slide down toward the rear edges 43 of the louvers 41 and, therefore, the length of louvers 41 should preferably be kept relatively short to assure efficient unsnipped bean removal.

As seen in FIGS. 2, 3 and 4 a rearwardly declining conveyor table 13 having an infeed portion 13a and a discharge portion 13b extends through the drum 12 and is supported on frame 11 by four flexible plastic strips 44 which are securely bolted at their bottom ends to frame 11 and at their top ends to conveyor table 13. The infeed portion 13a of the conveyor table 13 has a conventional, commercially available shaker 14 fixedly attached thereto for imparting vibration to the conveyor table. As best seen in FIG. 2, the flexible strips 44 are mounted on frame 11 in a forwardly inclined position so that the oscillation of conveyor table 13 comprises an upward, rearward movement and a downward, forward movement as shown by the arrow in FIG. 2. The beans are moved rearwardly down the declining conveyor table 13 by the rapid oscillation of the conveyor table which tends to throw the beans slightly upwardly and rearwardly. The shaker 14 is driven by the motor 15 thorugh a V-belt 45 and, as shown in FIG. 1, belt 45 may be enclosed in a protective guard 45a.

The infeed portion 13a of conveyor table 13 is adapted to receive a mixed supply of snipped and unsnipped beans from a conventional bean snipper machine and to distribute same on the then bottom portion of the revolving drum 12. As seen in FIG. 3, in the preferred embodiment, the infeed portion 13a of conveying table 13 takes the form of a flanged, flat-bottom trough having a discharge hole 13c therein. The forward edge 13d of the discharge hole 13c or in other words, the rearward edge of infeed portion 13a, is diagonally disposed with respect to the longitudinal axis of the drum. The incoming beans are generally longitudinally aligned by the vibration of the declining infeed portion 13a of the conveyor table 13. As the beans are moved rearwardly on the infeed portion 13a of conveying table 13 they drop over the diagonally disposed edge 13d of discharge hole 13c and are thus distributed along a portion of the length of the drum bottom. Having the edge 13d diagonally disposed is an important feature of my invention since it causes the mixed supply of beans to be dispersed on the bottom of the drum 12 which facilitates the pick up of unsnipped beans by the drum.

The discharge portion 13b of conveyor table 13 is provided for discharging unsnipped beans from drum 12. The discharge portion 13b is generally in the form of a flanged, flat-bottom trough. It is provided with a declining baffle section 13e at its forward end extending over and covering the discharge hole 13c of the infeed portion 13a of the conveyor table 13 so that those unsnipped beans which are dropped from that portion of pick-up drum 12 above the discharge hole 13c will not fall through the hole 13c into the bottom of the drum. These beans, instead, will be deflected by the baffle section 13e into the discharge portion 13b of the conveying table 13 for discharge from the drum 12. The discharge hole 13c in the infeed portion 13a of conveyor table 13 begins approximately in line with the forward end of the first row of louvers 41 in the drum 12. In other words, the most forward point on the diagonally disposed edge 13d is approximately in the plane of the forward end of the first row of louvers 41 in the drum 12. Due to this preferred arrangement, beans will be dropped closely adjacent the flange 31a of the forward peripheral rim 31 and, therefore, substantially the entire length of the drum 12 is effectively utilized for picking unsnipped beans. The baffle section 13e of the discharge portion 13b of the conveyor table 13 extends forwardly to overlie the edge 13d so that unsnipped beans which are dropped from the upper portion of drum 12 cannot fall through the discharge hole 13c onto the bottom of the drum 12.

Guide walls 46 and 47 are fixedly secured to cross-members 22 and 24 of the frame 11 for directing falling unsnipped beans into the discharge portion 13b of conveyor table 13. As seen in FIGS. 3–5, guide wall 46 is smaller than wall 47 and spaced farther from the wall of the drum 12 than guide wall 47 to allow beans to be carried upwardly by drum 12 without interference from guide wall 46.

As best seen in FIGS. 2, 4, and 5, a longitudinally extending wire 48 is supported inside of the pick-up drum 12 between a pair of upright supports 49 and 50 which are fixedly secured to the frame. The wire 48 is positioned closely adjacent the wall of the drum at a position of about ten o'clock when looking from the discharge end of the drum to the infeed end as in FIGS. 4 and 5. The wire 48 is adapted to knock off any unsnipped beans which haven't otherwise dropped off the drum 12. The wire 48 assures that no unsnipped beans will be carried completely around and back to the bottom of the drum.

In operation, my unsnipped bean removing machine 10 is located in a bean processing line after a conventional bean-snipper machine which snips the stems from about 90 to 99 percent of the beans which pass through it. All of the beans, snipped and unsnipped, are dropped from the bean-snipper machine into the trough-like infeed portion 13a of the rearwardly declining conveyor table 13. The vibration imparted to the conveyor table, by shaker 14 causes the beans to be generally longitudinally aligned in the infeed portion of the conveyor table and to be advanced down the declining infeed portion and over its diagonally disposed edge 13d, and distributed along a portion of the length of the bottom of the drum 12. A mixed supply of snipped and unsnipped beans is, thus, dropped to the then bottom of the infeed end of the revolving pick-up drum. The snipped beans, that is, the 90 to 99 percent of the beans that have had their stems removed in the conventional bean-snipper machine, remain in the bottom of the revolving pick-up drum and due to the rotation and pitch of the drum, they gradually work down to the discharge end 12b where they are discharged from the bottom of the drum into the canning line.

As best seen in FIG. 5, the short, generally curved, stem portions of the unsnipped beans which are deposited on the bottom of the infeed end 12a of the drum become hooked on the longitudinal edges 42 of the louvers 41 as the drum turns in the direction shown by the arrow in FIG. 5. The rotation of the drum carries the unsnipped beans hooked thereto around to a position above conveyor table 13 and, as the drum continues to turn, the weight of the unsnipped beans causes their stems to become disengaged from the louvered drum and they fall onto the discharge portion 13b of the conveyor table which passes through the drum. The vibration imparted to the conveyor table by shaker 14 causes the unsnipped beans to be advanced down the declining discharge portion of the conveyor table and out the discharge end of the drum above the snipped beans which are being discharged from the bottom of the discharge end of the drum. Thus, the unsnipped beans are separated from the snipped beans which go to the canning line. The unsnipped beans are diverted to another processing line.

Ordinarily a few of the unsnipped beans which are hooked onto the louvered drum 12 tend to remain hooked thereto and are carried beyond the top of the drum. The wire 48 which extends through the drum at a position of about 10 o'clock knocks these beans off the drum and onto the discharge portion 13b of the conveyor table 13 and thus prevents any beans from travelling completely around to the bottom of the drum and becoming mixed with the snipped beans which are being discharged into the canning line.

It is apparent that my unsnipped bean removing machine is simple in construction and, therefore, relatively inexpensive and dependable in operation. It is also apparent that substantially the full length of the drum is utilized for picking up unsnipped beans.

It is further apparent that the unsnipped beans which are removed from the snipped beans are not skinned, bruised, or otherwise damaged and, therefore, may be canned after further processing.

It should also be noted that since there are no gears, bearings, or other grease-requiring parts within the confines of the pick-up drum and since the inside of the pick-up drum is substantially free of parts in which beans might become clogged, my unsnipped bean removing machine is extremely clean in operation and, if desired, can be easily cleaned after use by simply hosing it with water.

It is understood that my invention is not confined to the particular construction and arrangements of parts herein illustrated and described, but embraces all such modified forms thereof as may come within the scope of the following claims.

I claim:
1. Apparatus for removing unsnipped beans from a mixed supply of snipped and unsnipped beans, comprising:
    (a) a frame,
    (b) a generally cylindrical-walled drum rotatably mounted on said frame and having a forward infeed end for receiving a mixed supply of snipped and unsnipped beans and a rearward discharge end,
    (c) said drum having a plurality of rows of outwardly extending louvers providing substantially straight longitudinal edges and rear edges transverse to said substantially straight longitudinal edges in the wall of said drum whereby the unsnipped beans of said mixed supply of beans deposited in said drum hook on said substantially straight longitudinal edges in the wall of said drum, said longitudinal edges being substantially in the plane of the inner surface of the wall of said drum, said louvers being inclined from the wall of said drum in the direction opposite to the rotation of said drum,
    (d) means for rotating said drum about its longitudinal axis,
    (e) conveyor means extending through said drum for conveying unsnipped beans out of said drum,
    (f) the rotation of the said drum causing the unsnipped beans hooked to the substantially straight longitudinal edges formed in the wall of said drum to be carried to a position above said conveyor means and to be deposited thereon for discharge from said drum.
2. The apparatus as specified in claim 1 including a wire mounted on said frame adjacent the wall of said drum and extending substantially through said drum above said conveyor means for disengaging any unsnipped beans from said longitudinal edges in the wall of said drum which have not otherwise dropped off onto said conveyor table.
3. The apparatus as specified in claim 1 wherein said conveyor means comprises a conveyor table mounted on said frame and extending through said drum, said conveyor table having an infeed portion and a discharge portion, said infeed portion being adapted to deposit a mixed supply of snipped and unsnipped beans on the bottom portion of the infeed end of said drum, and means for vibrating said conveyor table.
4. The apparatus as specified in claim 1 wherein said conveyor means comprises a conveyor table mounted on said frame and extending through said drum, said conveyor table having an infeed portion and a discharge portion, said infeed portion having a rearward edge over which said mixed supply of snipped and unsnipped beans is adapted to drop to the bottom portion of the infeed end of said drum, and means for vibrating said conveyor table.
5. The apparatus as specified in claim 4 wherein said conveyor table includes a baffle section extending over the rearward edge of said infeed portion.
6. The apparatus as specified in claim 4 wherein the rearward edge of said infeed portion is diagonally disposed with respect to the longitudinal axis of said drum for distributing said mixed supply of snipped and unsnipped beans along a portion of the length of said drum.
7. Apparatus for removing unsnipped beans from a mixed supply of snipped and unsnipped beans, comprising:
    (a) a frame,
    (b) a generally cylindrical-walled drum rotatably mounted on said frame and having a forward infeed end for receiving a mixed supply of snipped and unsnipped beans and a rearward discharge end,
    (c) said drum having a plurality of rows of outwardly extending louvers providing substantially straight longitudinal edges and rear edges transverse to said substantially straight longitudinal edges in the wall of said drum whereby the unsnipped beans of said mixed supply of beans deposited in said drum hook on said substantially straight longitudinal edges in the wall of said drum, said longitudinal edges being substantially in the plane of the inner surface of the wall of said drum, said louvers being inclined from the wall of said drum in the direction opposite to the rotation of said drum,
    (d) means for rotating said drum about its longitudinal axis,
    (e) conveyor means extending through said drum for conveying unsnipped beans out of said drum, and
    (f) means for disengaging the unsnipped beans from said longitudinal edges for deposit on said conveyor means.

References Cited by the Examiner
UNITED STATES PATENTS

| | | | |
|---|---|---|---|
| 345,725 | 7/1886 | Prinz | 209—95 |
| 493,065 | 3/1893 | Campbell | 209—95 X |
| 835,517 | 11/1906 | Glunt | 209—78 |
| 1,082,879 | 12/1913 | Klauer | 209—78 |
| 1,155,204 | 9/1915 | Birnstock. | |
| 2,650,704 | 9/1953 | Musil | 209—95 |
| 3,200,945 | 8/1965 | Cota | 209—76 |

ROBERT B. REEVES, *Primary Examiner.*

Disclaimer and Dedication 3,259,241.—*William N. Hughes*, Columbus, Wis. UNSNIPPED BEAN REMOVER. Patent dated July 5, 1966. Disclaimer and dedication filed Mar. 4, 1968, by the assignee, *Hughes Company Inc.*

Hereby disclaims and dedicates to the Public the entire patent.
[*Official Gazette July 2, 1968.*]